UNITED STATES PATENT OFFICE.

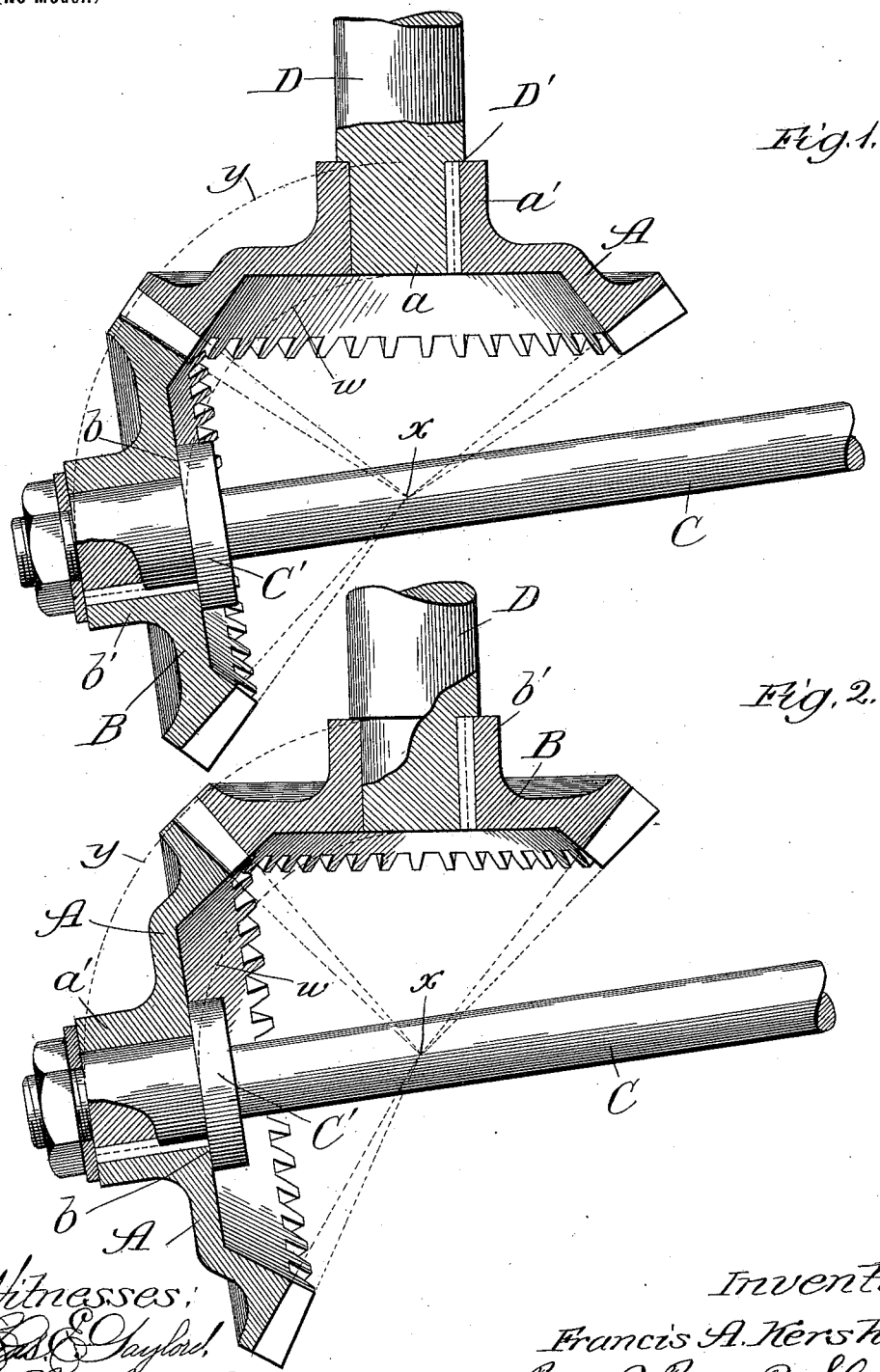

FRANCIS A. KERSHAW, OF KENOSHA, WISCONSIN.

BEVEL-GEAR.

SPECIFICATION forming part of Letters Patent No. 614,251, dated November 15, 1898.

Application filed November 22, 1897. Serial No. 659,477. (No model.)

*To all whom it may concern:*

Be it known that I, FRANCIS A. KERSHAW, a citizen of the United States, residing at Kenosha, in the county of Kenosha and State of Wisconsin, have invented certain new and useful Improvements in Bevel-Gears, of which the following is a specification.

The object of my invention is to provide a set of bevel-gears of such construction that they may be readily interchanged one with the other for the purpose of obtaining different speeds of shafts without disturbing the position of the shafts; and the invention consists in the features and details of construction hereinafter described and claimed.

In the accompanying drawings, Figure 1 is a longitudinal sectional view of a pair of intermeshing beveled gears constructed in accordance with my improvements, and Fig. 2 a similar view showing the gears as having been changed from one shaft to the other.

In the art to which this invention relates it is well known that the use of bevel-gearing is the most economical method of transmitting power and motion from one shaft to another when such shafts rotate in different angular planes—that is, when such shafts are located at an angle to each other. It is further well known that up to the present time no means have been devised by which a variation in the speed of such shafts could be obtained by changing the beveled gears without making special gears for each place—that is, the beveled gears could not be moved from one shaft to the other without disturbing the relation of the shafting. This is at times a very serious objection—as, for example, when it is necessary to make slight variations in the speed of the shafts—that is, change the angular velocity of the shafts. The principal object of my invention, therefore, is to overcome this objection by providing a pair of bevel-gears and constructing them in such manner that the gears may be changed from one shaft to the other and run in such position without in any way disturbing the position of the shaft.

In constructing bevel-gears in accordance with my improvements I make a pair of bevel-gears A and B and mount them upon shafts C and D at nearly right angles to each other.

My improved bevel-gears are so constructed that their inner faces $a$ and $b$ are at the same distance from the apex X of the cones—that is, a circle W, described from the center X, would be tangent with these faces. The gears have further a hub or body portion $a'$ and $b'$, the length of which is determined by describing a circle Y from the center X. It will thus be seen that the length of the axial openings of both gears is the same. In other words, the distances from the front faces to the rear faces of the gears are equal. When the shafts are arranged as in the figures shown—that is, the one passing the other, so that the gears engage at a point to the rear of the center X—the faces $a$ and $b$ will always be tangent with the circle W, so that the gears may be changed from one shaft to the other, as shown in Fig. 2. It will be seen that the shaft C has a shoulder C', against which the front face of the gears must abut, while the shaft D has a shoulder D', against which the rear face of the gears must abut.

By this construction it will be seen that I obtain the advantage of being able to change the gears from one shaft to the other without in any way disturbing the relation of the same.

I claim—

In bevel-gearing, the combination of two intermeshing bevel-gears of different diameters, and shafts for the gears at a fixed angle to each other, provided with stops against which faces of the hubs of the gears abut, the gears each having the faces of its hub at such distances from a corresponding given pitch-circle, that the gears will be brought into mesh when interchanged, substantially as described.

FRANCIS A. KERSHAW.

Witnesses:
THOMAS F. SHERIDAN,
THOMAS B. MCGREGOR.